US012774044B2

(12) United States Patent
Perez

(10) Patent No.: US 12,774,044 B2
(45) Date of Patent: Oct. 27, 2026

(54) PICKUP TRUCK PANEL

(71) Applicant: Ford Global Technologies, LLC, Dearborn, MI (US)

(72) Inventor: Gerardo Perez, Delegación Tlalpan (MX)

(73) Assignee: Ford Global Technologies, LLC

( * ) Notice: Subject to any disclaimer, the term of this patent is extended or adjusted under 35 U.S.C. 154(b) by 318 days.

(21) Appl. No.: 18/594,738

(22) Filed: Mar. 4, 2024

(65) Prior Publication Data

US 2025/0276744 A1 Sep. 4, 2025

(51) Int. Cl.
*B62D 33/06* (2006.01)
*B60R 13/08* (2006.01)

(52) U.S. Cl.
CPC .......... *B62D 33/0604* (2013.01); *B60R 13/08* (2013.01)

(58) Field of Classification Search
CPC .. B62D 33/0604; B62D 33/02; B62D 33/023; B62D 33/06; B62D 27/04; B60R 13/04; B60R 13/06; B60R 13/07; B60R 13/08; B60R 13/0815
USPC .............................. 296/190.08, 190.01, 35.1
See application file for complete search history.

(56) References Cited

U.S. PATENT DOCUMENTS 4,398,758 A 8/1983 Tabares
4,613,183 A 9/1986 Kesling
4,917,435 A 4/1990 Bonnett et al.
5,090,765 A 2/1992 Gremillion
5,301,997 A 4/1994 Cudden
5,516,185 A 5/1996 O'Donnell et al.
6,106,045 A 8/2000 Gac et al.
6,116,677 A 9/2000 Gac et al.
7,766,416 B2 8/2010 McClure et al.
10,093,150 B2 * 10/2018 Waldner ................. B60H 1/248
10,577,032 B2 3/2020 Frederick et al.
10,730,460 B2 8/2020 Pawlowski
11,492,052 B2 11/2022 Holmstrom et al.
11,702,145 B2 * 7/2023 Byrne ..................... B60R 13/04 296/35.1
2003/0137161 A1 7/2003 Gillen
2011/0061336 A1 3/2011 Thomas
2015/0343965 A1 12/2015 Rowland
2021/0107177 A1 4/2021 Giles
2021/0324629 A1 10/2021 Brinton
2022/0072940 A1 3/2022 Hewitt et al.
(Continued)

FOREIGN PATENT DOCUMENTS

CN 106394429 A 2/2017
CN 110979471 A 4/2020
CN 213473328 U 6/2021
(Continued)

*Primary Examiner* — Roger L Pang
(74) *Attorney, Agent, or Firm* — Vichit Chea; Price Heneveld LLP

(57) ABSTRACT

A pickup truck includes a passenger cabin and a pickup box having a front wall that is spaced apart from a rear wall of the passenger cabin to form a gap. An insulating structure is secured to the rear wall of the passenger cabin. The insulating structure covers at least a portion of the rear wall of the passenger cabin. The insulating structure includes a protrusion extending along a lower portion of the insulating structure. The protrusion reduces a size of the gap between the front wall of the pickup box and the rear wall of the passenger cabin.

20 Claims, 7 Drawing Sheets

(56) References Cited

U.S. PATENT DOCUMENTS

| | | | | |
|---|---|---|---|---|
| 2022/0315132 | A1* | 10/2022 | Holmstrom ............ | B62D 33/02 |
| 2023/0261331 | A1 | 8/2023 | Morton et al. | |

FOREIGN PATENT DOCUMENTS

| | | | |
|---|---|---|---|
| CN | 213566167 | U | 6/2021 |
| CN | 218966844 | U | 5/2023 |
| DE | 4318080 | A1 | 4/1994 |
| DE | 202006013385 | U1 | 1/2008 |
| KR | 20100027087 | A | 3/2010 |

* cited by examiner

PICKUP TRUCK PANEL

FIELD OF THE DISCLOSURE

The present disclosure generally relates to an insulator for a rear wall of a pickup cab, and more particularly to an integrated insulator.

BACKGROUND OF THE DISCLOSURE

Pickup trucks may include a cab and a box or bed that are mounted to a frame, thereby forming a gap between a rear wall of the cab and a front wall of the pickup box. Various types of seals have been developed to reduce noise that propagates through the gap between the cab and the pickup box.

SUMMARY OF THE DISCLOSURE

An aspect of the present disclosure is a pickup truck including a frame structure and a passenger cabin secured to the frame structure. The passenger cabin includes a passenger space and an upright back wall having an exterior rear side and a lower edge. The pickup truck further includes a pickup box secured to the frame structure. The pickup box includes a bed and first and second sidewalls extending upwardly along opposite sides of the bed. The pickup box further includes a front wall extending upwardly along a front of the bed. The front wall of the pickup box has a lower edge and a forward side that is spaced apart from the exterior rear side of the upright back wall of the passenger cabin to define a gap therebetween. The pickup truck further includes an insulating structure that is disposed on the upright back wall of the passenger cabin. The insulating structure covers at least a lower portion of the exterior rear side of the upright back wall. The insulating structure includes first and second outer layers of sound absorbing material and a core disposed between the first and second outer layers of sound absorbing material. At least a portion of the second outer layer of the insulating structure faces the exterior rear side of the upright back wall, and the first outer layer faces the front wall of the pickup box. The insulating structure includes an upper portion and a protrusion that extends outwardly from the upper portion towards the front wall of the pickup box to reduce a dimension of the gap at the protrusion. At least a portion of the protrusion is horizontally aligned with the lower edge of the front wall of the pickup box.

Embodiments of the first aspect of the present disclosure can include any one or a combination of the following features:

- The protrusion may optionally have a flat central portion that is above the lower edge of the front wall of the pickup box.
- The front wall of the pickup box may optionally include a flat portion that is horizontally aligned with the flat central portion of the protrusion of the insulating structure.
- The flat central portion of the protrusion may optionally extend across a lower portion of the insulating structure to form a horizontal band.
- The first and second outer layers of material of the insulating structure may be spaced apart a first dimension at the upper portion of the insulating structure to define a first thickness, and the first and second outer layers of material may be spaced apart a second dimension at the protrusion of the insulating structure to define a second thickness, and the second dimension may be greater than the first dimension.
- The upright back wall of the passenger cabin may have an upper edge that is vertically spaced apart from the lower edge of the upright back wall to define a first height dimension, and the insulating structure may define upper and lower edges that are vertically spaced apart to define a second height dimension. The second height dimension may be at least one half the first height dimension.
- The first and second outer layers may comprise a scrim material, and the core may comprise foam.
- The exterior side of the upright back wall of the passenger cabin may comprise sheet metal having a plurality of raised portions and at least one channel therebetween. The second outer layer of the insulating structure may include at least one protrusion that is received in the at least one channels.
- An air extractor may be disposed in a central portion of the upright back wall of the passenger cabin. The air extractor may be configured to permit air to flow out of the passenger space. The insulating structure may include a cutout portion extending around at least a portion of the air extractor whereby the insulating structure does not interfere with air flowing through the air extractor.
- The bed of the pickup box may have a lower side that extends rearwardly from the lower edge of the front wall of the pickup box, and the lower side of the pickup box may be above a level of the lower edge of the upright back wall of the passenger cabin.
- The upright back wall of the passenger cabin may include a main portion and an upright lower portion that is offset forwardly from the main portion. The upright back wall may further include a flange extending between a lower edge of the main portion and the upright lower portion. The insulating structure may include a lower portion that extends around and covers the flange and the upright lower portion of the upright back wall of the passenger cabin.

Another aspect of the present disclosure is a pickup truck including a passenger cabin having a rear wall. The pickup truck further includes a pickup box having a front wall that is spaced apart from the rear wall of the passenger cabin to form a gap. The pickup truck further includes a structure interconnecting the passenger cabin and the pickup box. An insulating structure is secured to the rear wall of the passenger cabin. The insulating structure includes an upper portion covering a central portion of the rear wall of the passenger cabin, and a lower portion covering a lower portion of the rear wall of the passenger cabin. The insulating structure includes a protrusion extending in a side-to-side direction along a lower portion of the insulating structure. The protrusion projects outwardly towards a lower portion of the front wall of the pickup box, whereby the gap is reduced in size between the protrusion and the lower portion of the front wall of the pickup box.

- The insulating structure may optionally include upper and lower edges defining a second height therebetween, and the rear wall of the passenger cabin may optionally include upper and lower edges defining a first height therebetween. The second height may be at least one half of the first height.
- The insulating structure optionally includes outer layers of sound-absorbing material and a core disposed between the outer layers.

The outer layers optionally comprise a scrim material, and the core optionally comprises foam.

The pickup box optionally includes a bed structure having upper and lower sides, and the front wall of the pickup box optionally intersects the lower side of the bed structure at a horizontally-extending lower edge of the front wall of the pickup box. At least a portion of the protrusion is optionally horizontally aligned with the lower edge of the front wall of the pickup box.

The protrusion optionally includes a flat outer surface, and at least a portion of the flat outer surface is optionally disposed above the lower edge of the front wall of the pickup box.

The flat outer surface of the protrusion optionally extends along a lower portion of the insulating structure at a constant vertical location.

Another aspect of the present disclosure is a method of reducing noise transmission through a gap between a rear wall of a pickup cab and a front wall of a pickup box. The method includes forming an insulating structure having a foam core disposed between outer layers of sound absorbing material, wherein a first side of the insulating structure is configured to fit against the rear wall of a pickup cab, and a second side of the insulating structure includes a protrusion extending along a lower edge of the insulating structure. The method includes positioning the insulating structure on the rear wall of the pickup cab whereby the protrusion reduces a size of the gap. The method optionally includes horizontally aligning the protrusion with a portion of a bed structure of the pickup box.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 1.

DETAILED DESCRIPTION OF THE PREFERRED EMBODIMENTS

Figure 1:
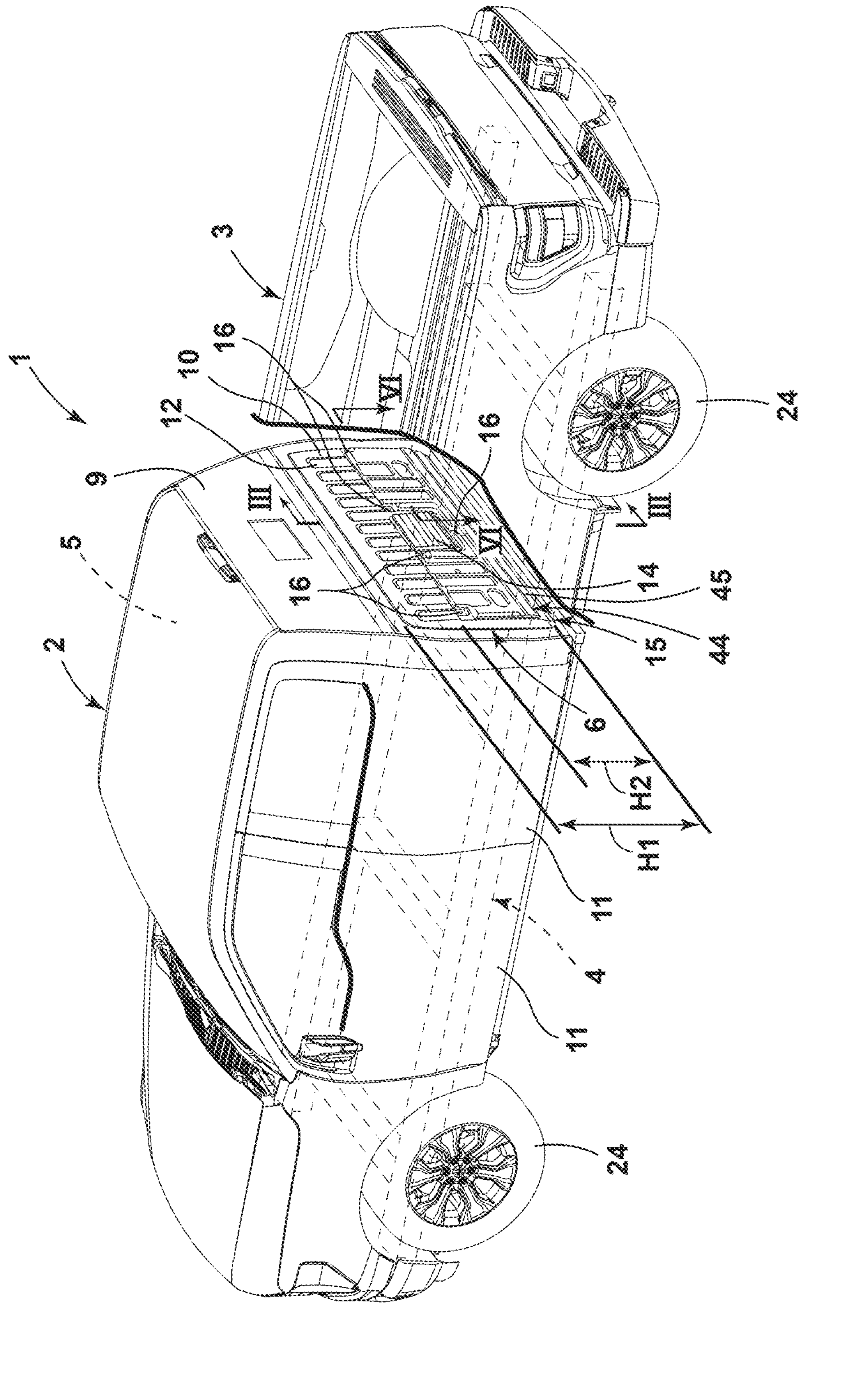
FIG. 1 is a partially fragmentary isometric view of a pickup truck according to an aspect of the present disclosure.

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term “and/or,” when used in a list of two or more items, means that any one of the listed items can be employed by itself, or any combination of two or more of the listed items can be employed. For example, if a device or structure is described as containing components A and/or B and/or C, the device or structure can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms “comprises,” “comprising,” or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by “comprises . . . a” does not, without more constraints, preclude the existence of additional identical elements in the process, method, article, or apparatus that comprises the element. As used herein, the term “about” means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term “about” is used in describing a value or an end-point of a range, the disclosure should be understood to include the specific value or end-point referred to. Whether or not a numerical value or end-point of a range in the specification recites “about,” the numerical value or end-point of a range is intended to include two embodiments: one modified by “about,” and one not modified by “about.” It will be further understood that the end-points of each of the ranges are significant both in relation to the other end-point, and independently of the other end-point.

The terms “substantial,” “substantially,” and variations thereof as used herein are intended to note that a described feature is equal or approximately equal to a value or description. For example, a “substantially planar” surface is intended to denote a surface that is planar or approximately planar. Moreover, “substantially” is intended to denote that two values are equal or approximately equal. In some embodiments, “substantially” may denote values within about 10% of each other, such as within about 5% of each other, or within about 2% of each other.

As used herein the terms “the,” “a,” or “an,” mean “at least one,” and should not be limited to “only one” unless explicitly indicated to the contrary. Thus, for example, reference to “a component” includes embodiments having two or more such components unless the context clearly indicates otherwise. For purposes of description herein, the terms “upper,” “lower,” “right,” “left,” “rear,” “front,” “vertical,” “horizontal,” and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
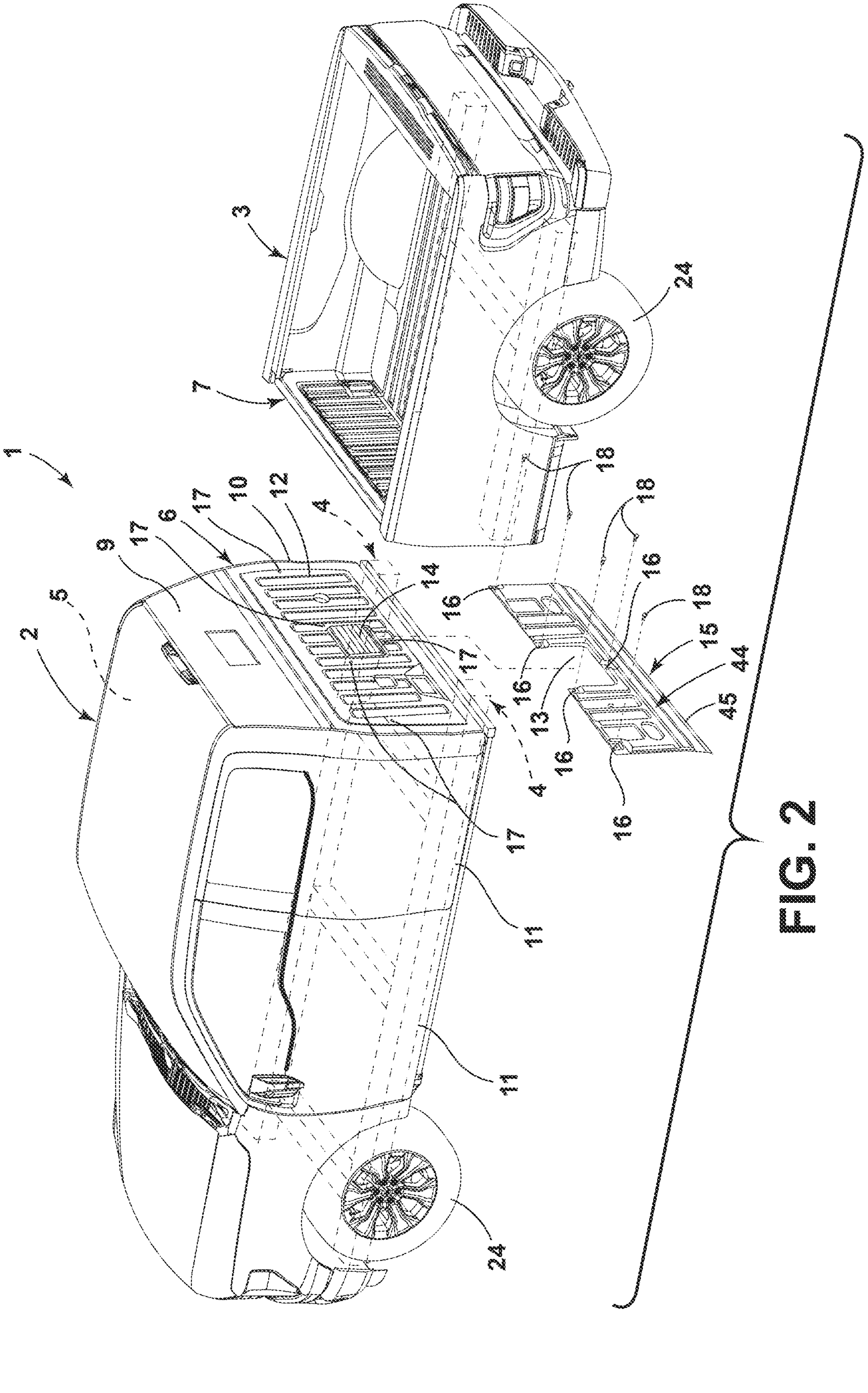
FIG. 2 is a partially exploded fragmentary isometric view of the pickup truck of FIG. 1 in which the truck cab and box are spaced apart.

With reference to FIGS. 1 and 2, a pickup truck 1 according to an aspect of the present disclosure includes a cab 2 and a bed or box 3. Cab 2 and box 3 may be mounted to a frame 4. The cab 2 includes an interior space 5 and a rear wall 6 that faces front wall 7 of box 3 to form a gap 8 (see also FIG. 4). As discussed in more detail below, an insulator 15 having a protrusion 44 (FIG. 4) may be secured to the rear wall 6 of cab 2 to reduce a size of gap 8 and/or absorb sound that would otherwise be transmitted through rear wall 6 into interior space 5. Protrusion 44 may form a band that extends side-to-side along a lower portion 45 of insulator 15. It will be understood that FIG. 2 is a partially exploded view showing the rear wall 6 of cab 2 and front wall 7 of box 3 spaced apart a distance that is much greater than the actual gap 8 (FIG. 4) that is formed between rear wall 6 of cab 2 and front wall 7 of box 3 in pickup truck 1. (e.g. FIG. 1).

Figure 6:
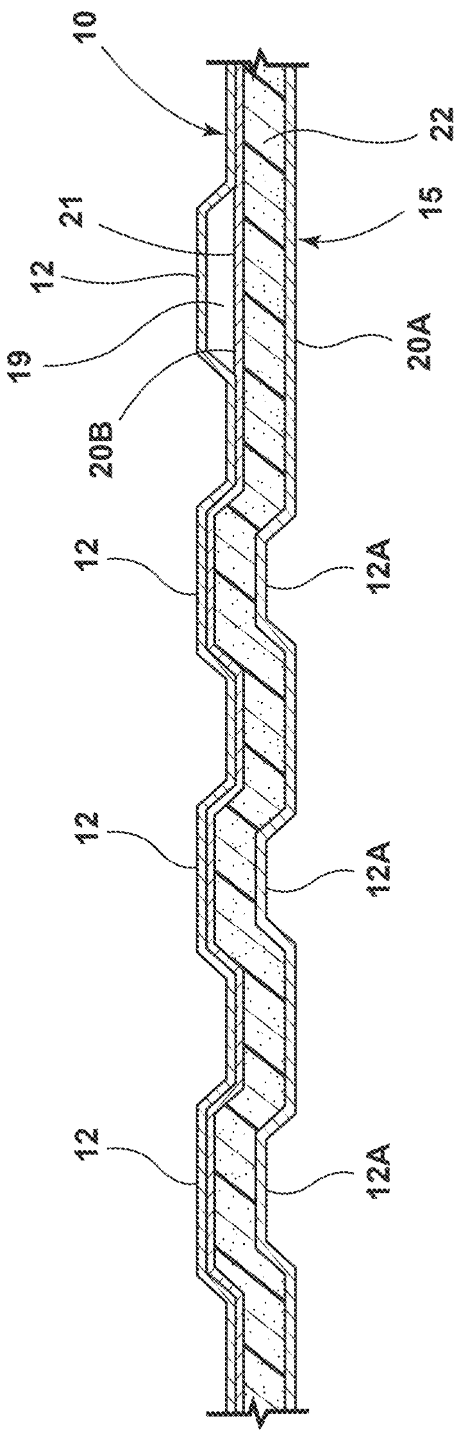
FIG. 6 is a partially fragmentary cross-sectional view taken along the line VI-VI.

Referring again to FIGS. 1 and 2, cab 2 may include a window 9 and a rear panel structure 10 below window 9. Rear panel structure 10, may, optionally include one or more structures 12 in the form of vertically extending raised portions and channels between the raised portions. As shown in FIG. 6, structures 12 may comprise vertically extending corrugations, and insulator 15 may include corresponding corrugations 12A that are received in corrugations 12 of panel 10. Alternatively, insulator 15 may include a flat surface 21 that extends across one or more corrugations 12 to form a gap or cavity 19 (FIG. 6). Rear wall 6 may also include an air extractor 14 of a type that is generally known. Air extractor 14 extends across an opening in rear wall 6 and permits air to escape from interior 5 when, for example, a door 11 is closed. Insulator 15 may include a cutout portion 13 that fits around at least a portion of air extractor 14. Rear panel structure 10 may have a height "H1," and insulator 15 may have a height "H2." The height H2 of insulator 15 is preferably at least about one half the height H1 of rear panel structure 10. However, H2 may be less than one half H1. Alternatively, H2 may be about equal to H1.

Figure 4:
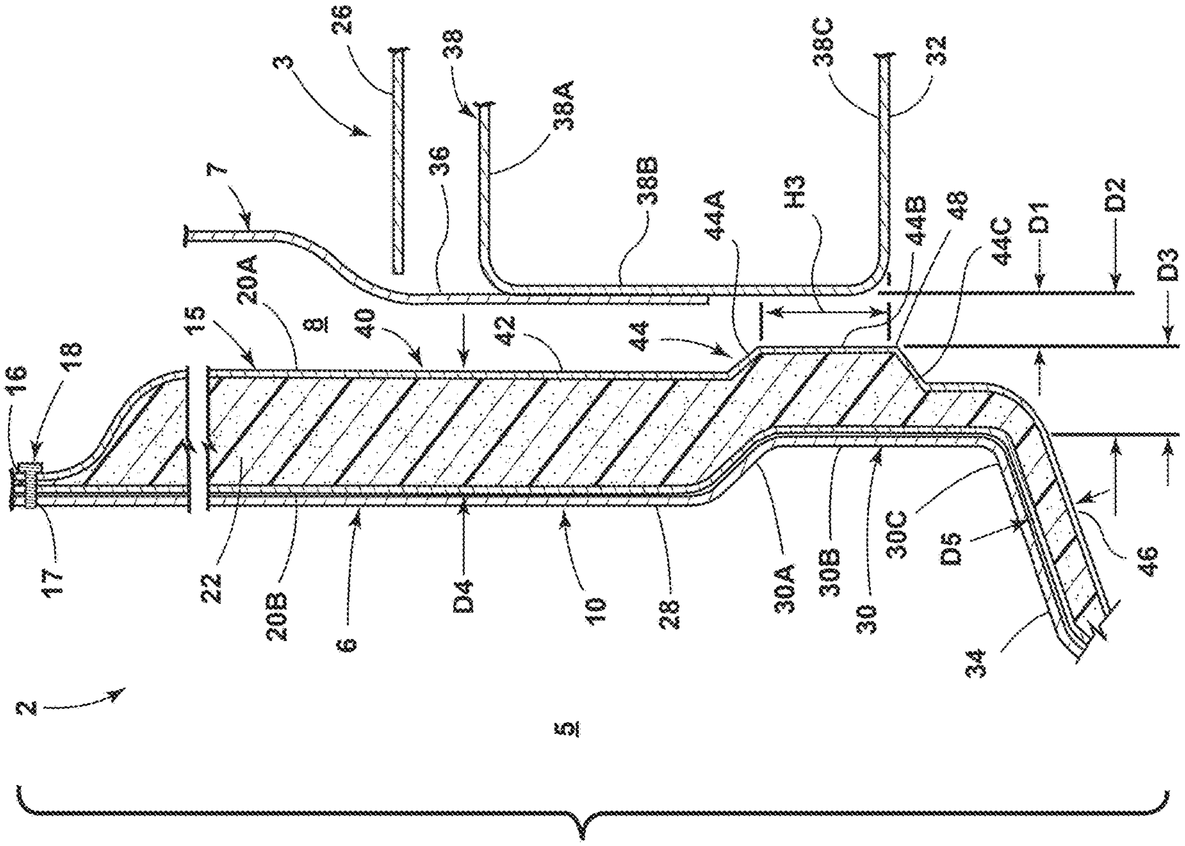
FIG. 4 is a partially fragmentary enlarged view of the structure of FIG. 3.

Insulator 15 may be secured to rear wall 6 of cab 2 to provide a reduced dimension "D1" (FIG. 4) between rear wall 6 of cab 2 and front wall 7 of box 3 in the region of protrusion 44 of insulator 15. As shown in FIG. 4, in the illustrated example, without insulator 15 the gap between rear wall 6 of cab 2 and front wall 7 of box 3 would be "D2." Insulator 15 may include one or more openings 16 (FIG. 2) that receive mechanical fasteners such as push pins or push nuts 18 that are received in openings 17 of rear wall 6 of cab 2 to thereby secure insulator 15 to the cab 2. It will be understood that virtually any suitable fastening arrangement (e.g. adhesives, mechanical fasteners, or the like) may be utilized to secure insulator 15 to cab 2.

Figure 3:
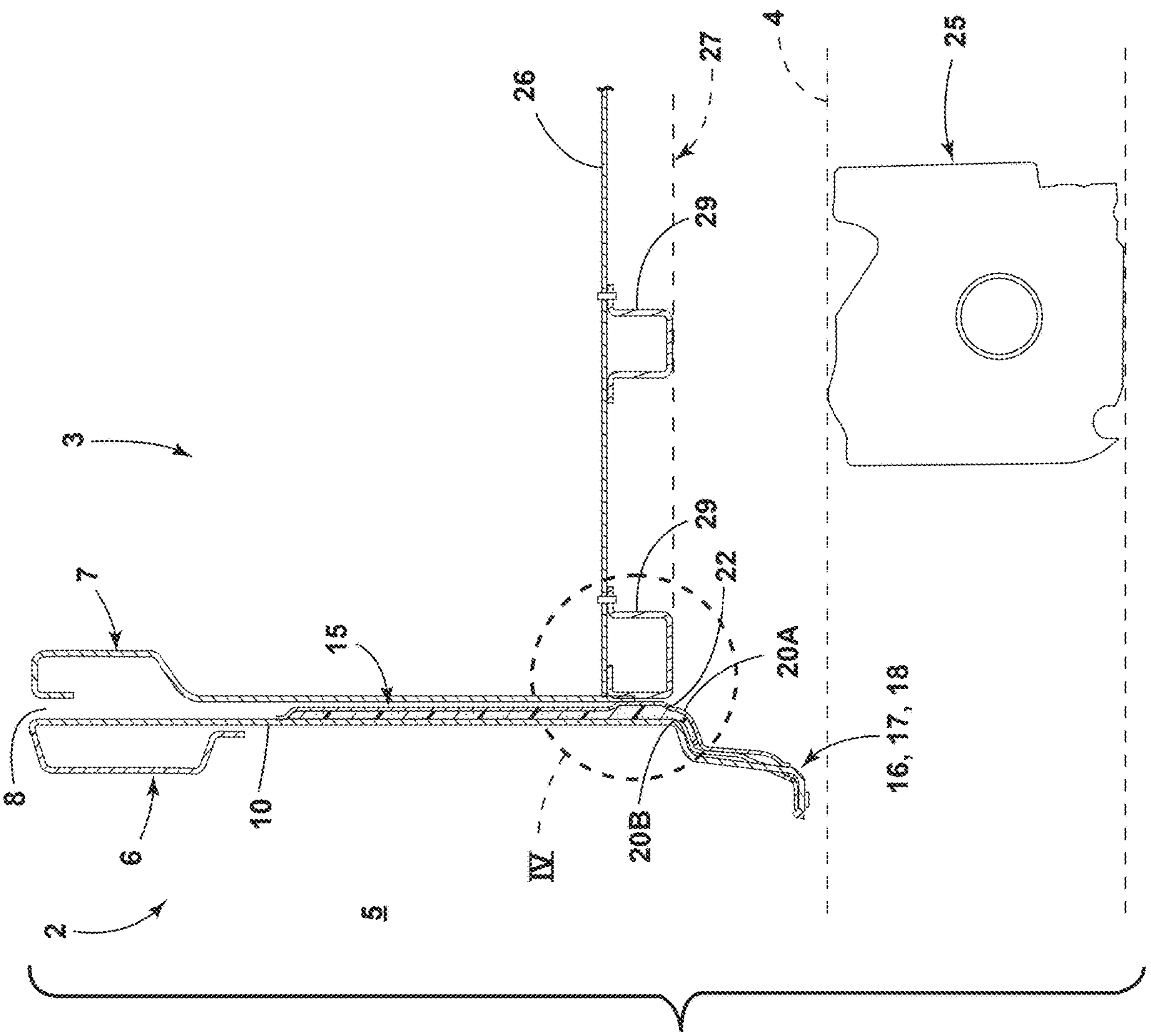
FIG. 3 is a partially fragmentary cross-sectional view taken along the line III-III, FIG. 1.
Figure 5:
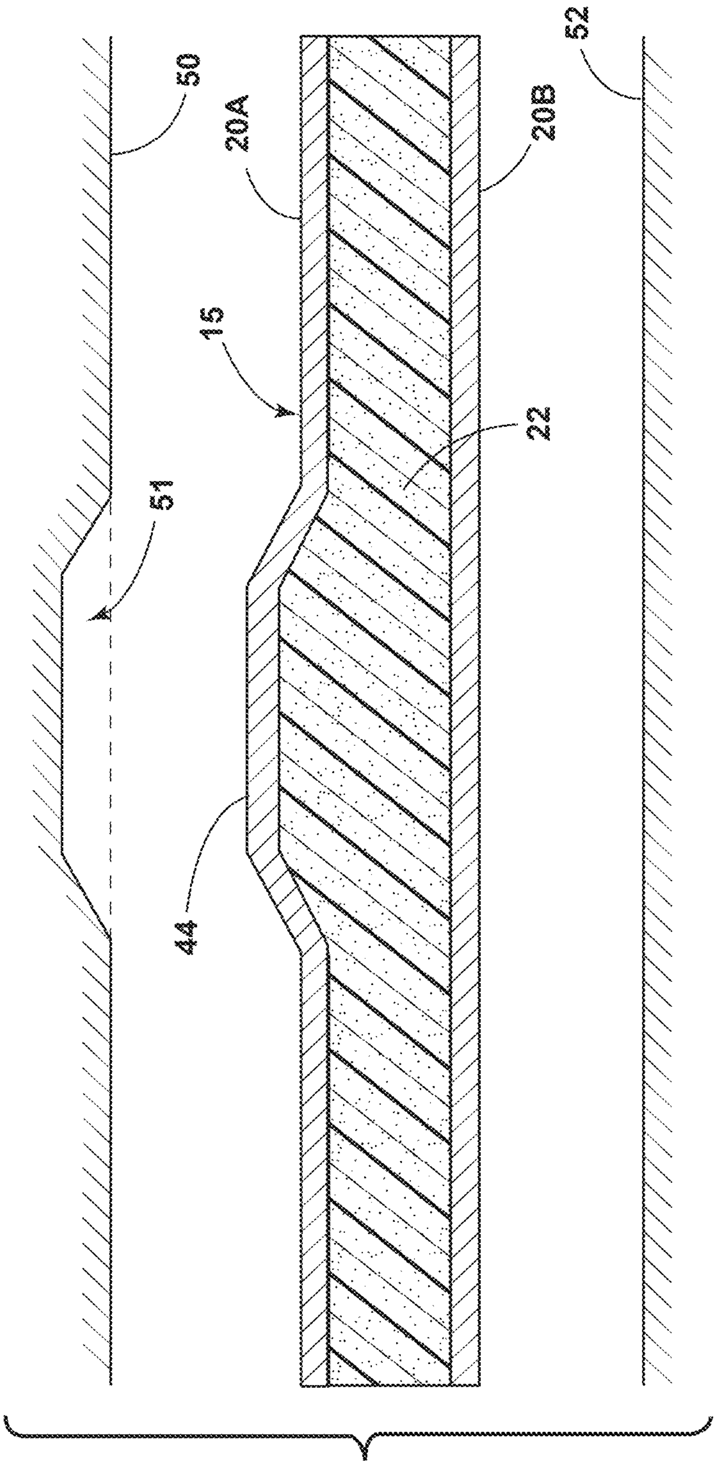
FIG. 5 is a partially schematic cross-sectional view of the insulator.

With further reference to FIGS. 3-5, insulator 15 may include outer layers 20A and 20B, and a core 22. The outer layers 20A and 20B may comprise a sound absorbing material such as scrim material (e.g. polyethylene terephthalate (PET) fibers), and core 22 may comprise a lightweight foam (e.g. open cell foam), which may have a density of, for example, 15 kg/m$^3$. The foam of core 22 preferably absorbs sound and/or vibration. In a preferred embodiment, outer layer 28 may comprise a scrim having a weight of about 120 grams per square meters (GSM), and scrim 20B may be about 50 GSM. It will be understood that these are merely examples of suitable materials, and the present disclosure is not limited to any specific materials or dimensions. In general, the materials of insulator 15 and the dimensions of insulator 15 may be selected to provide a desired degree of sound and/or vibration reduction in cab 2 as required for a particular application.

Figure 7:
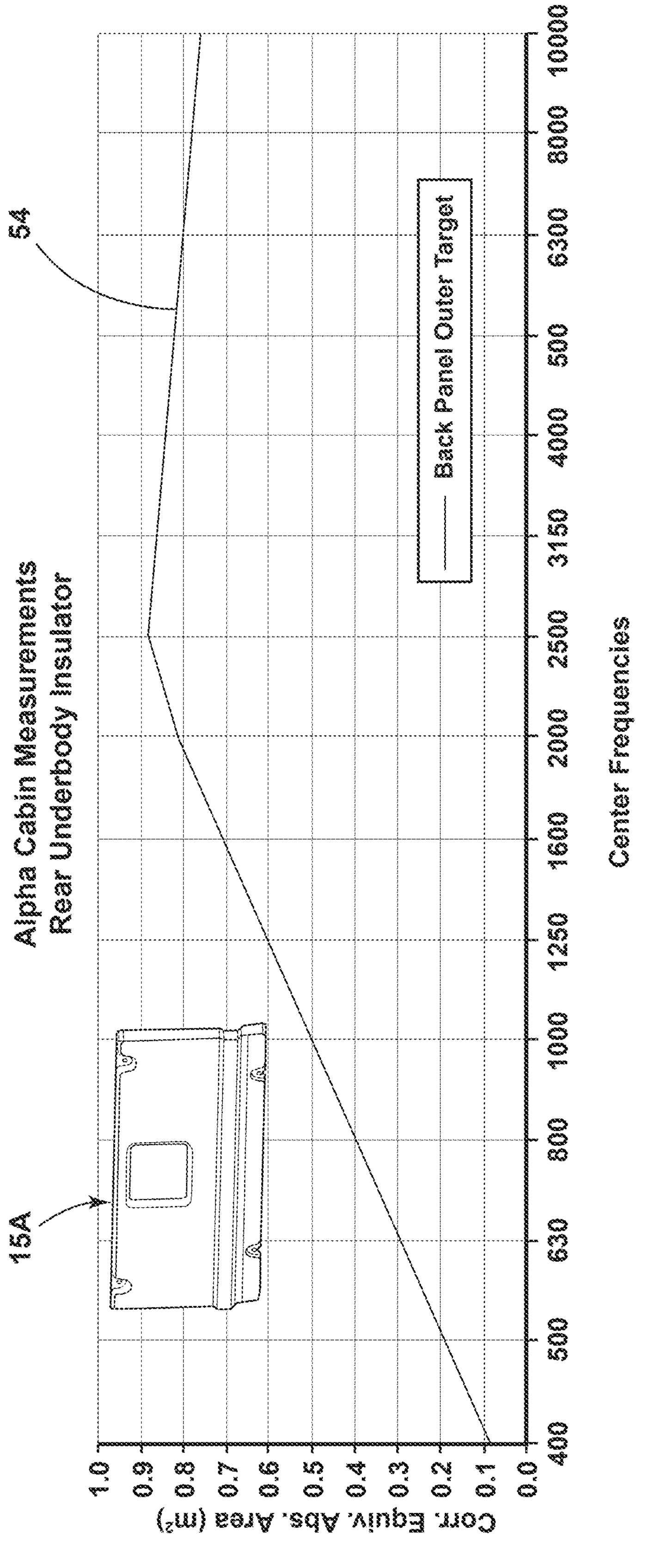
FIG. 7 is a graph showing acoustic test results for an insulator according to an aspect of the present disclosure.

With reference to FIG. 7, an insulator according to the present disclosure may provide significant sound absorption. Specifically, the equivalent absorption area (line 54) for a test panel or insulator 15A having an area of0.766 square meters may range from about 0.1 at a 400 Hz center frequency to about 0.88 at a 2,500 Hz center frequency. In general, in the case of a surface, the equivalent absorption area (vertical axis of FIG. 7) is the product of the area of the surface and its sound power absorption coefficient. The test panel/insulator 15A utilized in the testing of FIG. 7 includes outer scrim layers 20A and 20B and a core 20 that are substantially similar to the corresponding features of insulator 15. In general, the acoustic characteristics of an insulator 15 according to the present disclosure may vary somewhat depending on the shape, size, thickness, etc. of a specific insulator 15 as required for a particular application. Nevertheless, the test results of FIG. 7 demonstrate that an insulator 15 according to the present disclosure may provide significant reductions in Noise, Vibration, and Harshness (NVH), including in the interior space 5 of cab 2. For example, the test results of FIG. 7 may comprise a design goal or requirement, and an insulator 15 may, in some cases, be configured to meet or exceed the test results of FIG. 7. It will be understood, however, that the test results of FIG. 7 do not necessarily need to be used as a design requirement, and an insulator 15 according to some aspects of the present disclosure may have acoustic properties that are not identical to the results of FIG. 7.

Referring again to FIG. 4, in the illustrated example rear panel structure 10 of cab 2 includes an upright upper portion 28 and a protrusion 30 that extends horizontally in a side-to-side manner across a lower portion of wall 6 of cab 2. Protrusion 30 is horizontally aligned with a lower surface 32 of box 3. Protrusion 30 may include an upper portion 30A that extends rearwardly and downwardly, an upright central portion 30B, and a lower portion 30C that extends downwardly and forwardly. Lower portion 30C of protrusion 30 may extend forwardly to form a lower portion 34 of rear panel structure 10 of cab 2 that is located forward of upright upper portion 28 of back panel 10 that extends downwardly and forward from central portion 30B of protrusion 30. The back panel 10 may comprise sheet metal or the like, and the upright portion 28, protrusion 30, and lower portion 34 may be formed from a single sheet of steel or the like. Protrusion 30 is optional, and the rear panel structure may be substantially flat in the region of protrusion 44 of insulator 15 as shown in FIG. 3.

In the illustrated example, the front wall 7 of bed 3 includes a first portion 36 (FIG. 4) that may be welded to a channel structure 38 having upper and lower portions 38A and 38C that extend horizontally from upright central portion 38B. In the illustrated example, the dimension D2 between protrusion 30 and upright portion 38B of channel structure 38 of front wall 7 of bed 3 may be about 25-50 mm (e.g. about 35 mm), and the dimension D1 of gap 8 may be about 2-10 mm (e.g. about 5 mm). If rear panel structure 10 is flat (FIG. 3) without protrusion 30, dimension D3 may be about 40 mm-60 mm (e.g. about 50 mm). Insulator 15 may include an outer surface 40 that faces the front wall 7 of box 3. Surface 40 may include an upper portion 42 and protrusion 44. Protrusion 44 may include an angled upper portion 44A, an upright central portion 44B, and an angled lower portion 44C. Lower portion 46 of surface 40 of insulator 15 may extend downwardly and forwardly. In the illustrated example, protrusion 44 has a dimension "D3" of about 20 mm-40 mm (e.g. about 30 mm) to provide a gap dimension D1 of about 5 mm. The central portion 44B may have a height "H3" of about 20 mm-80 mm (e.g. about 50 mm), and a lower corner 48 at a junction of portions 44B and 44C may be at about a same vertical location as lower surface 32 of box 3. In the illustrated example, the portion of insulator 15 above protrusion 30 may have a thickness "D4" of about 30 mm-80 mm (e.g. about 50 mm), and the lower portion of insulator 15 adjacent lower portion 46 of outer surface 40 may have a dimension "D5" of about 10 mm-30 mm (e.g. about 20 mm). It will be understood that the dimensions, shapes, and sizes of insulator 15, rear wall 6 of cab 2, and front wall 7 of box 3 may vary as required for a particular application, and the dimensions described herein are merely examples according to an aspect of the present disclosure.

With reference to FIG. 3, bed structure 26 of pickup truck 1 may include transverse reinforcing structures 29 defining a lower side 27 of bed structure 26. Pickup truck 1 may comprise an electrically-powered vehicle and may include an electric motor 25 that is positioned below bed structure 26 of pickup box 3. Electric motor 25 may be operably connected to wheels 24 (FIGS. 1 and 2) of pickup truck 1 by a suitable drive train (not shown). The insulator 15 may be configured to reduce or block noise from electric motor 25 that would otherwise pass through gap 8 and/or into interior space 5 of cab 2 through rear wall 6 of cab 2.

With further reference to FIG. 5, during the fabrication of insulator 15 the outer layers 20A and 20B may be positioned on opposite sides of foam core 22, and the material may be positioned between upper and lower forming surfaces 50 and 52 to mold the insulator utilizing a thermocompression process that may be substantially similar to known thermocompression processes. In general, the forming parts or surfaces 50 and 52 may have non-planar shapes (e.g. recessed area 51) as required to form protrusion 44 and other non-planar features of insulator 15. In a preferred embodiment, layer 20A and/or layer 20B are formed from a hydrophobic type material to resist penetration by water.

In contrast to known horizontal seals which include a horizontally extending rigid structure (e.g. a metal flange) and a resilient (e.g. rubber) member secured to the rigid member, the insulator 15 of the present disclosure provides a one piece sound and vibration isolator that reduces transmission of noise through gap 8 (FIG. 4), and also provides sound and/or vibration insulation over a substantial portion of the rear wall 6 of pickup cab 2. For example, as discussed above in connection with FIG. 1, a height H2 of insulator 15 may be at least about one half the vertical dimension H1 of rear panel structure 10 of rear wall 6 of cab 2. Thus, insulator 15 preferably reduces noise that is transmitted through gap 8 due to the reduced dimension D1 (FIG. 4), and also reduces sound and vibration that could otherwise be transmitted through rear wall 6 of cab 2.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A pickup truck comprising:

a frame structure;

a passenger cabin secured to the frame structure, the passenger cabin including a passenger space and an upright back wall having an exterior side and a lower edge;

a pickup box secured to the frame structure, the pickup box including a bed and first and second side walls extending upwardly along opposite sides of the bed, the pickup box including a front wall extending upwardly along a front of the bed the front wall having a lower edge and a forward side that is spaced apart from the exterior rear side of the upright back wall of the passenger cabin to define a gap therebetween; and an insulating structure disposed on the upright back wall of the passenger cabin and covering at least a lower portion of the exterior rear side of the upright back wall, the insulating structure comprising first and second outer layers of sound absorbing material and a core disposed between the first and second outer layers of sound absorbing material, wherein at least a portion of the second outer layer faces the exterior rear side of the upright back wall, and the first outer layer faces the front wall of the pickup box, the insulating structure including an upper portion and a protrusion that extends outwardly from the upper portion towards the front wall of the pickup box to reduce a dimension of the gap at the protrusion, wherein at least a portion of the protrusion is horizontally aligned with the lower edge of the front wall of the pickup box.

2. The pickup truck of claim 1, wherein:

the protrusion has a flat central portion that is above the lower edge of the front wall of the pickup box.

3. The pickup truck of claim 2, wherein:

the front wall of the pickup box includes a flat portion that is horizontally aligned with the flat central portion of the protrusion of the insulating structure.

4. The pickup truck of claim 2, wherein:

the flat central portion of the protrusion extends across a lower portion of the insulating structure to form a horizontal band.

5. The pickup truck of claim 2, wherein:

the first and second outer layers of material are spaced apart a first dimension at the upper portion of the insulating structure to define a first thickness;

the first and second outer layers of material are spaced apart a second dimension at the protrusion of the insulating structure to define a second thickness; and the second dimension is greater than the first dimension.

6. The pickup truck of claim 1, wherein:

the upright back wall of the passenger cabin has an upper edge that is vertically spaced apart from the lower edge of the upright back wall to define a first height dimension;

the insulating structure defines upper and lower edges that are vertically spaced apart to define a second height dimension; and the second height dimension is at least one half the first height dimension.

7. The pickup truck of claim 1, wherein:

the first and second outer layers comprise a scrim material;

the core comprises foam.

8. The pickup truck of claim 1, wherein:

the exterior side of the upright back wall of the passenger cabin comprises sheet metal having a plurality of raised portions and at least one channel therebetween;

the second outer layer of the insulating structure includes at least one protrusion received in the at least one channel.

9. The pickup truck of claim 1, including:

an air extractor disposed in a central portion of the upright back wall of the passenger cabin that is configured to permit air to flow out of the passenger space; and wherein:

the insulating structure includes a cut out portion extending around at least a portion of the air extractor whereby the insulating structure does not interfere with air flowing through the air extractor.

10. The pickup truck of claim 1, wherein:

the bed of the pickup box has a lower side that extends rearwardly from the lower edge of the front wall of the pickup box;

the lower side of the pickup box is above a level of the lower edge of the upright back wall of the passenger cabin.

11. The pickup truck of claim 1, wherein:

the upright back wall of the passenger cabin includes a main portion and an upright lower portion that is offset forwardly from the main portion of the upright back wall, the upright back wall further including a flange extending between a lower edge of the main portion and the upright lower portion;

the insulating structure includes a lower portion that extends around and covers the flange and the upright lower portion of the upright back wall.

12. A pickup truck comprising:

a passenger cabin having a rear wall;

a pickup box having a bed structure having an upper side, opposite sidewalls extending upwardly along opposite sides of the bed structure, and a front wall that extends upwardly above the upper side of the bed structure, wherein the front wall is spaced apart from the rear wall of the passenger cabin to form a gap;

structure interconnecting the passenger cabin and the pickup box; and an insulating structure secured to the rear wall of the passenger cabin, the insulating structure having an upper portion covering a central portion of the rear wall of the passenger cabin and a lower portion covering a lower portion of the rear wall of the passenger cabin, wherein the insulating structure includes a protrusion extending in a side-to-side direction along a lower portion of the insulating structure, and wherein the protrusion projects outwardly towards a lower portion of the front wall of the pickup box whereby the gap is reduced in size between the protrusion and the lower portion of the front wall of the pickup box, and wherein the protrusion includes: 1) an upright central portion facing the lower portion of the front wall of the pickup box, and: 2) an upwardly-facing angled upper portion extending between the upright central portion of the protrusion and the upper portion of the insulating structure, wherein at least a portion of the angled upper portion is below a plane of the upper side of the bed structure.

13. The pickup truck of claim 12, wherein:

the rear wall of the passenger cabin has upper and lower edges defining a first height therebetween;

the insulating structure has upper and lower edges defining a second height therebetween; and the second height is at least one half of the first height.

14. The pickup truck of claim 12, wherein:

the insulating structure includes outer layers of sound-absorbing material and a core disposed between the outer layers.

15. The pickup truck of claim 14, wherein:

the outer layers comprise a scrim material, and the core comprises foam.

16. The pickup truck of claim 12, wherein:

the pickup box includes a bed structure having upper and lower sides;

the front wall of the pickup box intersects the lower side of the bed structure at a horizontally-extending lower edge of the front wall of the pickup box; and at least a portion of the protrusion is horizontally aligned with the lower edge of the front wall.

17. The pickup truck of claim 16, wherein:

the protrusion includes a flat outer surface;

at least a portion of the flat outer surface is disposed above the lower edge of the front wall.

18. The pickup truck of claim 17, wherein:

the flat outer surface extends along a lower portion of the insulating structure at a constant vertical location.

19. A method of reducing noise transmission through a gap between a rear wall of a pickup cab and a front wall of a pickup box, the method comprising:

forming an insulating structure having a foam core disposed between outer layers of sound absorbing material, wherein a first side of the insulating structure is configured to fit against the rear wall of a pickup cab, and a second side of the insulating structure includes a protrusion extending along a lower edge of the insulating structure; and positioning the insulating structure on the rear wall of the pickup cab whereby the protrusion reduces a size of the gap.

20. The method of claim 19, including:

horizontally aligning the protrusion with a portion of a bed structure of the pickup box.

* * * * *